Figure 1:
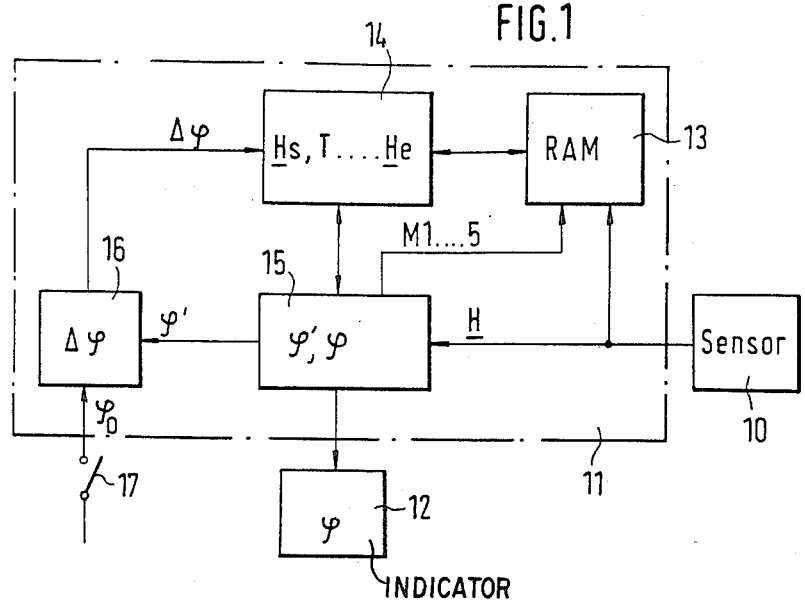

United States Patent [19]
Alberter et al.

[11] Patent Number: 4,729,172
[45] Date of Patent: Mar. 8, 1988

[54] PROCESS FOR ESTABLISHING THE DRIVING DIRECTION OF A VEHICLE WITH AN ELECTRONIC COMPASS

[75] Inventors: Günther Alberter; Harald Bauer, both of Nürnberg; Gerhard Hettich, Rosstal, all of Fed. Rep. of Germany

[73] Assignee: Robert Bosch GmbH, Stuttgart, Fed. Rep. of Germany

[21] Appl. No.: 802,011
[22] PCT Filed: Apr. 17, 1985
[86] PCT No.: PCT/DE85/00122
§ 371 Date: Nov. 7, 1985
§ 102(e) Date: Nov. 7, 1985
[87] PCT Pub. No.: WO86/00128
PCT Pub. Date: Jan. 3, 1986

[30] Foreign Application Priority Data
Jun. 16, 1984 [DE] Fed. Rep. of Germany ....... 3422491

[51] Int. Cl.⁴ .............................................. G01C 17/38
[52] U.S. Cl. .......................................... 33/356; 33/361
[58] Field of Search ........................... 33/356, 357, 361

[56] References Cited

U.S. PATENT DOCUMENTS 3,991,361 11/1976 Mattern et al. .................. 33/356 X
4,031,630  6/1977 Fowler ................................. 33/356
4,416,067 11/1983 Scherer et al. ................. 33/357 X
4,546,550 10/1985 Marchent et al. ................. 33/356

FOREIGN PATENT DOCUMENTS 2754888 12/1983 Fed. Rep. of Germany.

Primary Examiner—Harry N. Haroian
Attorney, Agent, or Firm—Michael J. Striker

[57] ABSTRACT

In a process for establishing the driving direction of a vehicle by an electronic compass fixedly mounted in the vehicle and which is provided with a magnetometer having a computerized evaluation circuit the local curve (O) of the earth field (He) is determined from five measuring points (M1 ... M5) which are established by turning the vehicle and corresponding signals are stored. The parameters for the center point displacement (Hs), the shape (ellipse) and the turning (angle α) of the local curve (O) in the vector diagram (x,y) are calculated by the computer by means of an algorithm with five unknowns for the five measuring points and thereafter the direction of the earth field (He) is computed. Subsequently, the vehicle is oriented to a predetermined cardinal direction and a correction angle is determined from the difference of angles between the cardinal and north directions and the earth's magnetic field direction measured by the compass. In the subsequent measurements the correcting angle is then taken into consideration when establishing the driving direction ($\phi$) from the local curve (O).

8 Claims, 5 Drawing Figures

PROCESS FOR ESTABLISHING THE DRIVING DIRECTION OF A VEHICLE WITH AN ELECTRONIC COMPASS

STATE OF THE ART

The invention is based on a process for establishing the vehicle direction of a vehicle with an electronic compass in accordance with the type of the main claim. In a known navigation apparatus (DE-PS No. 27 54 888) the driving direction of a vehicle is established with a two axis magnetometer, whose output signals are fed to a correction unit for compensating magnetic interference fields in the vehicle, whereby a zero point displacement of the output signals as well as a proportional change of one of the output signals is performed. In this solution one assumes that an interference field with a permanent vector is present which is superimposed with an earth field which is more or less screened by the vehicle body depending on the alignment of the vehicle. Thereby, in light of the zero point displacement the interference field vector is taken into consideration and by the proportional changing of one of the two magnetometer signals the effect of the vehicle body on the earth field should be compensated. Thereby, a local curve is provided for the measuring values of the magnetometer on its x and y axis by turning the vehicle, whose center point is displaced from the axis cross together with the vector of the interfering field, so that an ellipse is formed due to the proportional change of the signal on one axis, whose axis extend parallel to the measuring axis. Due to the proportional change of the one output signal the ellipse should be reshaped into a circle and due to the zero position displacement the circle should be located in the axis cross which is checked by a control step in that the corrected signals are elevated to a square and must form a constant value when being computed (circle equation).

It is disadvantageous in this known solution that the correction of the values measured by the magnetometer are performed in an analog computer circuit which is rather inaccurate in light of the known technology. Furthermore, it is not known in which manner the correcting dimensions are established. Since a control step is required it is to be assumed that the correcting dimensions must be established by scanning tests, which is rather cumbersome and erroneous. Moreover, only timely constant interference fields have to be considered in this manner. A further essential disadvantage of the known process consists in that only an axis parallel displacement is taken into consideration from the zero point for the elliptical local curve of the screened earth field, whereby in reality such an elliptical local curve is turned by any amount in the vector diagram. Since this turning is not picked up in the known measuring process, a considerable deviation results for a navigation of the established drive direction from the actual drive direction.

With the subject invention it is aimed to establish the direction of the earth field or the drive direction of the vehicle rather accurately by an accurate establishing of the actual local curve of the magnetic field measured by the magnetometer.

ADVANTAGES OF THE INVENTION

The process in accordance with the invention for establishing the driving direction with the characterizing features of the main claim has the advantage that with the stored measuring points the center point displacement as well as the shape and the turning of the local curve can be calculated by the computer in the vector diagram without necessitating scan tests. A further advantage can be seen in that with a calibrated measuring the installing tolerances for the magnetometer and the so-called erroneous direction of the earth field may be compensated. In this manner, it is possible to establish and indicate the accurate direction of the earth field or the driving direction to a preestablished destination from the current measurements on the magnetometer through the established local curve.

Due to the measures stated in the subclaims advantageous further embodiments and improvements of the features stated in the main claim are made possible. It is particularly advantages with the use of a microcomputer to pick up from the evaluation circuit the changes of the driving direction during the drive by measuring the magnetic field vector and to store a further measuring point of the local curve in the vector diagram when exceeding a preestablished value of the driving direction. The read further measuring points are further processed by the computer for checking and correcting the established parameters of the local curve. Moreover, the values for the driving direction change together with the path signals of the motor vehicle and may be used for an accurate destination determination of the vehicle. In order to approximately calculate the parameters of the local curve from the first five to ten measuring points in the vector diagram, it is essential that the vehicle is turned by at least 90° during the measurements.

Drawing

One exemplified embodiment is illustrated in the drawing and is explained in more detail in the following description.

Figure 2:
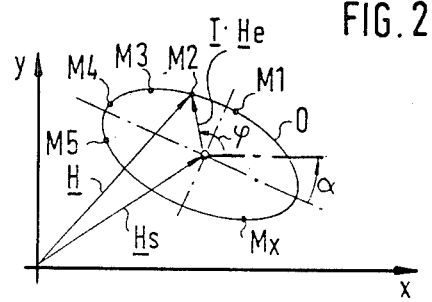
Figure 3:
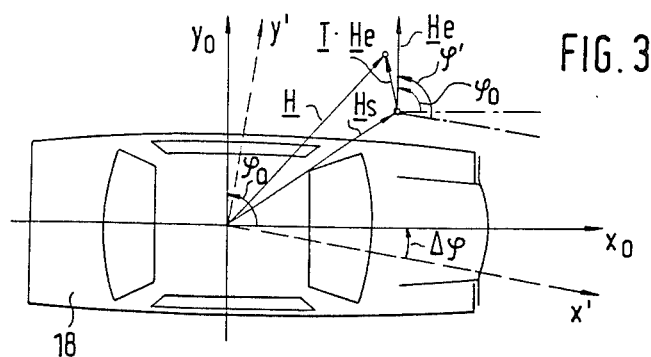
Figure 4:
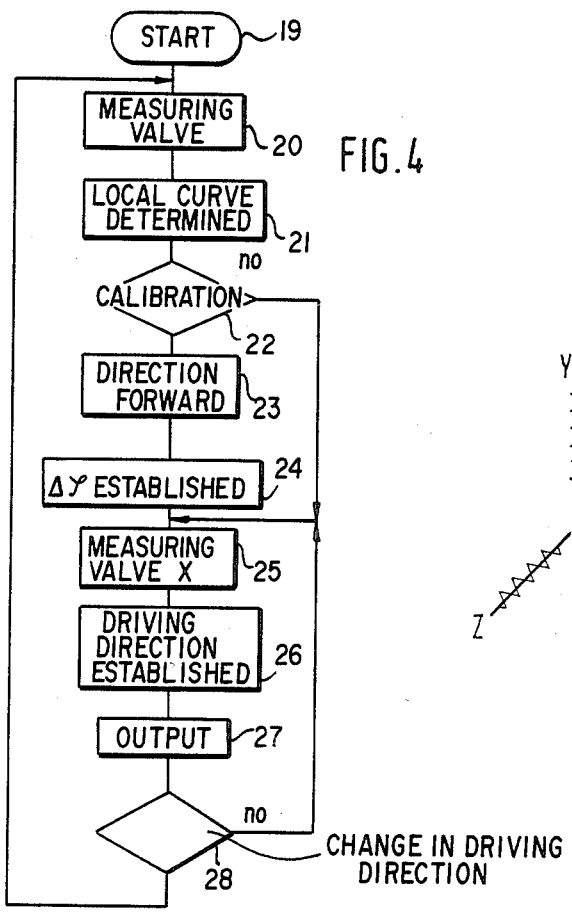
Figure 5:
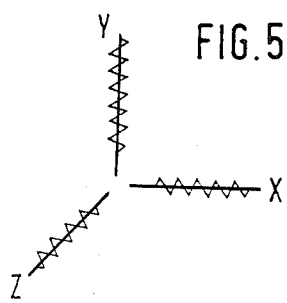

FIG. 1 is a block diagram of an electronic compass for establishing the drive direction of a motor vehicle in accordance with the invention, FIG. 2 is a vector diagram with the local curve of the magnetic field measured by the compass, FIG. 3 illustrates a motor vehicle with the vector axis in a calibrated position, FIG. 4 illustrates a flow diagram for the mode of operation of the electronic compass in accordance with FIG. 1, FIG. 5 illustrates a three-axis-magnetometer of an electronic compass in a schematic illustration.

DESCRIPTION OF THE EXEMPLIFIED EMBODIMENT

FIG. 1 shows the block diagram for an electronic compass which is stationary installed in a motor vehicle for navigation. The electronic compass consists of a sensor 10, an evaluation circuit 11 and an indicator 12. The sensor 10, which is mounted in the center under the roof of of a passenger vehicle, for example, contains a magnetometer with a time code. Thereby, the magnetometer may be a three-axis-magnetometer in accordance with FIG. 5 or a two-axis-magnetometer which is mounted in the sensor together with a power supply and a signal forming step for each of the magnet field probes.

The evaluation circuit is essentially realized by a microcomputer, whereby the sensor signals are fed to the input of the microcomputer. For a clearer illustration of the establishing of the driving direction of the vehicle, the evaluation circuit 11 is illustrated in detail showing a storage step 13, a calculating step 14 for calculating the parameters of a local curve of the measured magnetic field, a further calculating step 15 for determining the angle between the earth field and the driving direction as well as a correcting step 16 for the angle correction. Thereby, a fixed direction angle $\phi_o$ can be fed into the correction step 16 by means of a key switch 17. The calculator step 15 is connected by means of an output with the indicator 12 on which the driving direction can be indicated in addition to other informations.

With the assistance of FIGS. 2, 3 and 4 we would like to explain the operation of the process in accordance with the invention for establishing the drive direction of a vehicle. FIG. 2 illustrates the vector diagram for measuring the magnetic field in the motor vehicle with a magnetometer and two probes which are mounted in the sensor 10, whereby the one probe axis x is mounted in the driving direction and the other probe axis y is mounted in a horizontal plane with respect to the vehicle. The X-components or the Y components of the magnetic field vector H from the two probes are measured, whereby this vector is the result from the dimension and direction of the magnetic field on sensor 10. In FIG. 3, the vector H is illustrated with respect to the longitudinal axis $x_o$ and the transverse axis $y_o$ extending in the vehicle plane. Thereby, it is assumed that the sensor 10 is mounted in the center below the roof of the passenger vehicle 18. The measured magnetic field H is composed of a fixed interference field Hs and the components of the earth field He which are active in the vehicle. Although the actual vector of the magnetic field H is positioned oblique in the space, it suffices for determining the driving direction with the sensor to only measure the vector H of the magnetic field which is projected in the driving plane.

For establishing the driving direction it is required to find the direction of the earthfield He from the measured magnetic field vector H. For this purpose different successive process steps are required which are illustrated in a flow diagram in FIG. 4 which is cyclically passed by the evaluation circuit. After the start 19 at least five, preferably ten, measuring points in the vector diagram in accordance with FIG. 2 are picked up by the evaluation circuit 11 by turning the vehicle 18 and stored in the storage step 13 in a first program segment 20. In the exemplified case these are the measuring points M1 to M5 which are measured by the sensor 10 after each turning the vehicle 18 each time by about 30°. In accordance with FIG. 2, these five measuring values result in a mathematically fixed elliptical local curve 5 with five parameters, which is to be described by the following vector equation with respect to the axis cross of the vector diagram $$H = (T \cdot He) + Hs$$

thereby T is a tensor (matrix) which contains the influencing of the earth field by screening and magnetising of the vehicle body. He is the vector of the earth field which is projected to the driving plane outside of the vehicle and Hs is the vector of the constant interference field which is projected to the driving plane, which is predetermined by the shape and structure of the vehicle. This vector equation is an equation with five unknowns, whereby the vector H is known, while the tensor contains three unknowns and the vector Hs has also two unknowns.

In the following program segment 21 all parameters for the center point displacement, the shape and the turning of the local curve O are calculated in the vector diagram in calculating step 14 of the evaluation circuit 11 with the assistance of the measuring points M1 to M5. Theoretically, it would be possible to calculate the local curve O from five measuring points which may be located relatively tight with respect to each other. However, in light of the inaccuracies of the measuring points it is required that the first five measuring points in the vector diagram x, y are picked up by about at least 90° during the turning of the vehicle 18. However, the local curve O can be calculated with a more exact accuracy when eight measuring points are stored in the storage step 13, whereby one each measuring point is stored after each turning of the vehicle 18 by 45°. As can be seen in FIG. 2, the established local curve O represents an ellipse which is displaced by the constant interference vector Hs from the original axis of the vector diagram x, y and is turned with their axis around the angle. The angle $\phi$ is calculated in the calculation step 15 from the established parameters of the local curve O, thus giving the direction of the earth field He with respect to the x-axis of the vector diagram. However, this angle $\phi$ still requires a correction, since it does not take into consideration the so-called erroneous direction, that is, the deviation of the earth field direction from the actual north pole. Moreover, the installation tolerances are not taken into consideration when mounting the sensor 10 in vehicle 18, so that the x-axis of the probe of the magnetometer mounted in the driving direction does not coincide with the longitudinal axis $x_o$ of the vehicle. In FIG. 3 this installation tolerance and the erroneous direction is illustrated by a likely vector diagram with the axis x' and y' illustrated with dash lines which forms a rotation around angle $\Delta\phi$ together with the vehicle axis $x_o$ and $y_o$. In order to compensate these measuring errors a calibration of the electronic compass must now be performed in program section 22.

For this purpose the vehicle is placed in a predetermined cardinal point, in the exemplified case, towards east. This results in an angle $\phi_o$ with respect to the actual north direction which in the exemplified case is about 90°. This fixed predetermined angle dimension is fed into the correcting step 16 of the evaluation step 11 in accordance with FIG. 1 by actuating the key switch 17 in program segment 23. Simultaneously, in this vehicle position, the direction of the earth field He is established and the generated angle $\phi'$ is fed into the correction step 16 by means of the calculating step 14 and 15 on account of the continous measurements from the local curve O. Thereby $\phi'$, as shown in FIG. 3, represents the angle which the earth field He forms with the likely axis x' of the vector diagram x', y'. In the following program segment 24 a correction angle $\Delta\phi$ is formed in correction step 16 in that in accordance with the equation $$\Delta\phi = \phi' - \phi_o$$

the angle $\phi_o$ which had been adjusted by the longitudinal axis $x_o$ in northerly direction is deducted from the angle $\phi'$ of the earth field which had been established by the compass. The shaped correction angle $\Delta\phi$ is stored in the correction step 16 and is simultaneously fed to the calculating steps 14 and 15. With this correction angle the erroneous direction and the installation tolerances are compensated, so that the angle $\phi$ which had been established in the calculating step 15 represents now the actual angle of the longitudinal axis $x_o$ with respect to the northerly direction. In the following program segment 25 a new measuring value Mx on the local curve O in FIG. 2 by the values which were measured by the magnetometer of the sensor 10 and fed into the evaluation circuit 11, after the bginning of the drive, and on account of the established parameters Hs, T and and He the driving direction is again established in the program segment 26. In the program segment 27 this driving direction is finally indicated on indicator 12. In the program segment 28 a check is conducted in the evaluation circuit 11, whether a change of the drive direction of the vehicle 18 is present with respect to the direction of the latest stored measuring point by a defined angle amount a on the local curve O in the vector diagram in accordance with FIG. 2. If this is not the case, the program segments 25 and 28 are cyclically passed and the given calculated driving direction of the vehicle 18 is indicated. When exceeding a predetermined value a of the driving direction change of, for example, 30° with respect to the latest stored measuring point in the vector diagram in accordance with FIG. 2, a further measuring point is stored in the program step 20 in the storage step 13 and is further processed by the computer in program segment 21 for checking and correcting the established parameter of the local curve O. A calibration is no longer required since the already established correction angle $\Delta\phi$ is now constantly taken into consideration by the evaluation circuit 11.

If one would like to establish the spatial position of the magnetic field H, the earth field He and the interference field Hs which are measured on the sensor 10 for navigation purposes, the sensor 10 will be equipped with a magnetometer which is provided with three probes X, Y, Z in accordance with FIG. 5. Of these probes one is mounted in the driving direction of the vehicle, a second one is mounted transversely to the driving direction and the third one vertically with respect to the driving direction. By means of these probes X, Y, Z the spatial position, shape and turning of the local curve of the magnetic field H which is active on the magnetometer is measured in a spatial vector diagram by at least nine measuring points and is picked up and stored by the evaluation circuit for calculating the required parameter. In this case, the vehicle must not only be aligned in a predetermined driving direction but it must be aligned exactly horizontally when calibrating the electronic compass, so that a spatial correction angle can be established in this case.

The invention is not limited to an electronic compass for determining the driving direction of motor vehicles, since airplanes as well as water vehicles can be equipped therewith. Moreover, the compass may not be only used for establishing the driving direction, but may be generally used for navigation of vehicles from a fixed predetermined starting point to a defined destination point. In such a case a digital path signal is fed to the evaluation circuit, for example, by means of a wheel sensor or a signal transmitter on the kilometer counter of the vehicle during driving, which can be used together with the established driving direction for establishing the given position of the vehicle.

Due to the continous fed new measuring values into the storage step 13 during the driving an automatic after calibration is realized, which also takes into consideration changes of the shape, the position and the turning of the local curve. Thus, it is assured that the influences on the measured magnetic field H, which are caused by switching on of electrical consumers in the motor vehicle, like headlights, rear window heater, windshield wipers and the like, or by charging the motor vehicle, can be compensated during the calculation of the driving direction. A spatial interference change may be taken into consideration in all three coordinates with a three-axis-magnetometer in this manner and a corresponding error compensation may be performed. In addition to establishing the vehicle inclination or vehicle climbing from the change of the field vectors which are located in the driving plane, one can also calculate the position height of the vehicle and also indicated with a corresponding structured evaluation circuit together with path signals. For aftercalibration of the height information a predetermined height support point should be fed from time to time.

We claim:

1. Process for determining the driving direction of a motor vehicle including an electronic compass provided with a fixedly mounted magnetometer, said magnetometer having a plurality of probes arranged along mutually perpendicular axes to define a vector diagram and generating electrical signals depending on magnitude and direction of magnetic field present at said magnetometer, an evaluation circuit including a computer and storage means, said signals being applied to said evaluation circuit to determine the direction and magnitude of an interference magnetic field, the earth's magnetic field and the driving direction of the vehicle, the process comprising the steps of at least partially turning the vehicle, applying to said evaluating circuit the signals pertaining to at least five measuring points measured during the turning and storing said signals in the storing means; processing in the computer the stored signals according to an algorithm having at least five unknowns to compute the center point displacement, the shape and the turning of the local curve of the earth's magnetic field in the vector diagram; aligning the vehicle with a predetermined cardinal direction (east) and subtracting the angle $\phi_o$ between the cardinal and the north directions from the angle $\phi'$ of the earth's magnetic field indicated by the electronic compass to produce a correction angle $\Delta\phi$;

storing the correction angle in the storage means; and subtracting or adding in the computer said stored correction angle from or to a driving direction computed from measuring signals produced during subsequent measurements by said magnetometer.

2. Process in accordance with claim 1 wherein further measuring points (Mx) in the vector diagram are stored by the evaluation circuit during the driving and are processed by the computer for checking the correcting of the established parameters of the local curve.

3. Process in accordance with claim 2, wherein the changes of the driving direction are picked up by the evaluation circuit by measuring the magnetic field, and a further measuring point (Mx) in the vector diagram is stored when a predetermined value of the driving direction change is exceeded.

4. Process in accordance with claim 1 wherein the first five measuring points in the vector diagram are picked up and stored during the turning of the vehicle by at least 90°.

5. Process in accordance with claim 1 wherein the first five measuring points in the vector diagram are picked up and stored during the turning of the vehicle by at least 90°.

6. Process in accordance with claim 5, wherein parameters of one ellipse are established by the computer from the measuring points of the local curve in the vector diagram, whose axes are turned relative to coordinates of the vector diagram and which are displaced by the vector of the stationary interference field from the origin of the coordinates of the vector diagram (x, y).

7. Process in accordance with claim 1, wherein the magnetometer is provided with three probes (x, y, z) of which one is mounted in the driving direction, a second one transverse with respect to the driving direction and a third one vertically with respect to the driving direction.

8. Process in accordance with claim 7, wherein the spatial position, shape and turning of the local curve of the magnetic field which is active on the magnetometer is measured in a spatial vector diagram by at lest nine measuring points and the corresponding signals are picked up and stored by the evaluation circuit.

* * * * *